United States Patent
Shimada

(10) Patent No.: US 8,514,467 B2
(45) Date of Patent: Aug. 20, 2013

(54) DEVICE, COMPUTER READABLE MEDIUM AND METHOD FOR IMAGE READING

(75) Inventor: Yusuke Shimada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 958 days.

(21) Appl. No.: 12/609,488

(22) Filed: Oct. 30, 2009

(65) Prior Publication Data

US 2010/0110504 A1   May 6, 2010

(30) Foreign Application Priority Data

Oct. 31, 2008   (JP) ................................. 2008-282061

(51) Int. Cl.
    *H04N 1/04* (2006.01)
(52) U.S. Cl.
    USPC ........... 358/496; 358/474; 358/409; 358/412; 358/404; 358/444; 358/486; 358/488
(58) Field of Classification Search
    None
    See application file for complete search history.

(56) References Cited

U.S. PATENT DOCUMENTS

| | | | | |
|---|---|---|---|---|
| 4,908,664 A * | 3/1990 | Ogura | ................... | 399/204 |
| 5,333,057 A * | 7/1994 | Morikawa et al. | ............. | 358/296 |
| 5,864,408 A * | 1/1999 | Kumashiro | ................... | 358/461 |
| 6,369,918 B1 * | 4/2002 | Tom et al. | ................... | 358/486 |
| 6,615,116 B2 * | 9/2003 | Ebert et al. | ................... | 701/3 |
| 6,972,876 B2 * | 12/2005 | Yokochi | ................... | 358/471 |
| 7,301,680 B1 * | 11/2007 | Jones | ................... | 358/496 |
| 7,889,368 B2 * | 2/2011 | Iida et al. | ................... | 358/1.15 |
| 7,889,400 B2 * | 2/2011 | Akiyama | ................... | 358/496 |
| 8,040,577 B2 * | 10/2011 | Akiyama | ................... | 358/486 |
| 8,144,367 B2 * | 3/2012 | Yamada | ................... | 358/3.24 |
| 2006/0024559 A1 * | 2/2006 | Benthem et al. | ................ | 429/38 |
| 2009/0135440 A1 * | 5/2009 | Suzuki | ................... | 358/1.9 |
| 2010/0328734 A1 * | 12/2010 | Okada | ................... | 358/488 |
| 2011/0242611 A1 * | 10/2011 | Nozaki | ................... | 358/437 |

FOREIGN PATENT DOCUMENTS

| | | | |
|---|---|---|---|
| JP | 02058965 A | * | 2/1990 |
| JP | 2001-024839 | | 1/2001 |
| JP | 2002-118705 | | 4/2002 |
| JP | 2006-165750 | | 6/2006 |
| JP | 2007-067523 | | 3/2007 |

OTHER PUBLICATIONS

Notification of Reasons for Rejection in corresponding Japanese Application 2008-282061 mailed on Aug. 17, 2010.

* cited by examiner

*Primary Examiner* — Cheukfan Lee
(74) *Attorney, Agent, or Firm* — Banner & Witcoff, Ltd.

(57) ABSTRACT

Images from a set of documents may be read by an image reading device by, in one example, carrying the documents one by one. The read data may be stored and errors in an operation in the reading may be detected. When an error is detected, the reading of the documents may be stopped. Additionally, reading of the documents may be restarted when the error is no longer detected. According to one or more aspects, the reading may be restarted such that the read data obtained after restart of reading continues from the read data obtained before detection of the error. According to further aspects, the entire read data of the documents may be converted into a single file having a predetermined format.

15 Claims, 2 Drawing Sheets

DEVICE, COMPUTER READABLE MEDIUM AND METHOD FOR IMAGE READING

CROSS-REFERENCE TO RELATED APPLICATION

This application claims priority under 35 U.S.C. §119 from Japanese Patent Application No. 2008-282061, filed on Oct. 31, 2008. The entire subject matter of the application is incorporated herein by reference.

BACKGROUND

1. Technical Field

Aspects of the present invention relate to an image reading device which reads an image from a document.

2. Related Art

Image reading devices which carries documents one by one through an automatic document feeder (ADF) to read images from the documents, and converts data (hereafter, referred to as scanned data) of the read images into a single file having a predetermined format have been widely used.

SUMMARY

Incidentally, when a document can not be properly carried due to an error (e.g., a paper jam) in the image reading device, a user is required to place again all the documents on the ADF of the image reading device and to execute again image scanning from the beginning. It is understood that if the number of documents is large (e.g., 100 pages) and an error occurs in the image scanning at the 99-th page of the documents, the user is required to execute the image scanning from the first page of the documents, which is very time consuming and very troublesome for the user.

Aspects of the present invention are advantageous in that they provide at least one of an image reading device, a computer readable medium and a method configured such that even if an error occurs during image scanning for documents, scanned data obtained after a restart of the image scanning and scanned data obtained before occurrence of an error can be converted together into a single file.

According to an aspect of the invention, there is provided an image reading device, comprising: a reading unit configured to read images from a set of documents by carrying the documents one by one; a storing unit configured to store read data which the reading unit has obtained by reading the documents; an error detection unit configured to detect an error of an operation in the reading unit; a stopping unit configured such that when the error is detected by the error detection unit, the stopping unit stops reading of the documents by the reading unit; a restart instruction unit configured to instruct the reading unit to restart reading of the documents, a data processing unit configured to store the read data obtained after restart of reading of the document in the storing unit such that the read data obtained after restart of reading continues from the read data obtained before detection of the error; and a conversion unit configured to convert the entire read data of the documents stored in the storing unit into a single file having a predetermined format.

According to another aspect of the invention, there is provided a computer readable medium having computer readable instruction stored thereon, which, when executed by a processor of an image reading device, configures the processor to perform the steps of: controlling a reading unit of the image reading device to read images from a set of documents by carrying the documents one by one; storing read data obtained by reading the documents in a storing unit; detecting an error of a operation in the reading unit; stopping reading of the documents by the reading unit when the error is detected; instructing the reading unit to restart reading of the documents in response to recovery from the error, processing the read data by storing the read data obtained after restart of reading of the document in the storing unit such that the read data obtained after restart of reading continues from the read data obtained before detection of the error; and converting the entire read data of the documents stored in the storing unit into a single file having a predetermined format.

According to another aspect of the invention, there is provided a method for reading a set of documents to be implemented on an image reading device, comprising the steps of: controlling a reading unit of the image reading device to read images from the set of documents by carrying the documents one by one; storing read data obtained by reading the documents in a storing unit; detecting an error of a operation in the reading unit; stopping reading of the documents by the reading unit when the error is detected; instructing the reading unit to restart reading of the documents in response to recovery from the error, processing the read data by storing the read data obtained after restart of reading of the document in the storing unit such that the read data obtained after restart of reading continues from the read data obtained before detection of the error; and converting the entire read data of the documents stored in the storing unit into a single file having a predetermined format.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, an embodiment according to the invention will be described with reference to the accompanying drawings.

Figure 1:
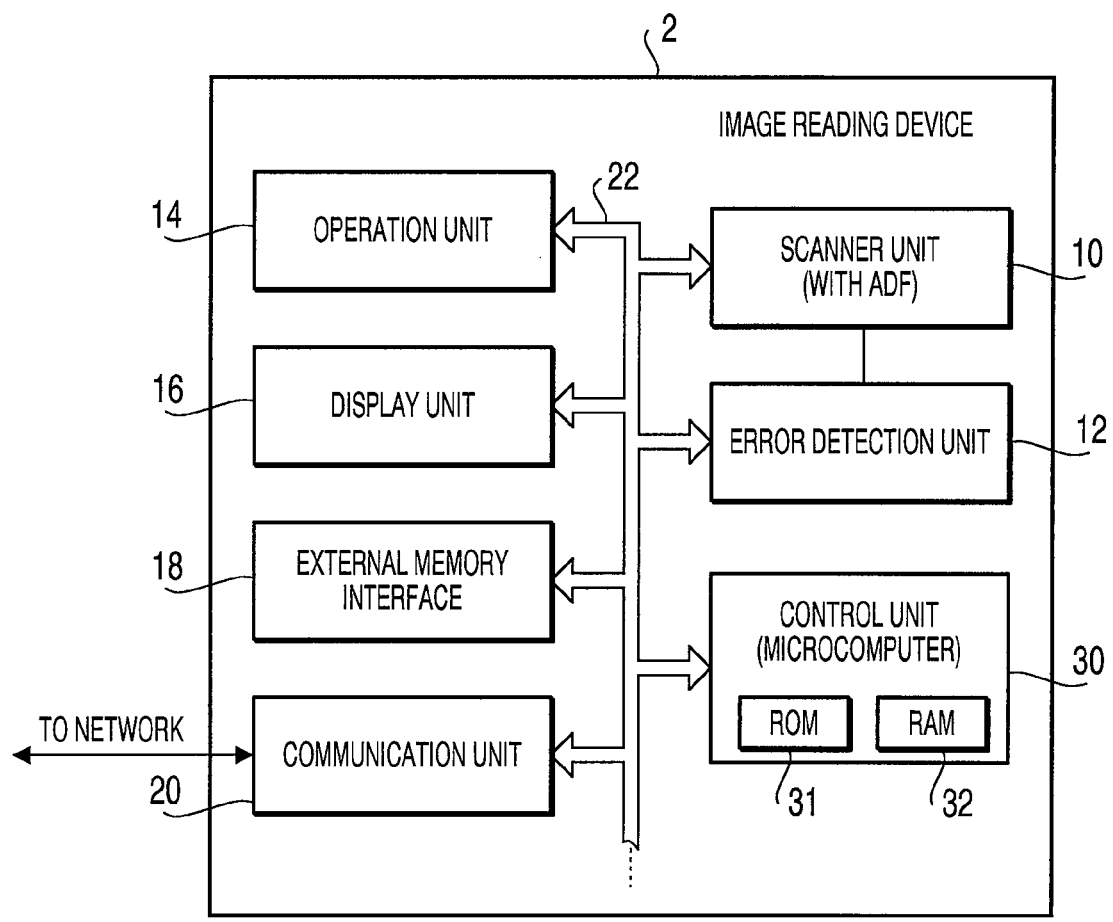
FIG. 1 is a block diagram of an image reading device according to an embodiment.

As shown in FIG. 1, an image reading device 2 includes a scanner unit 10 which reads an image from a document, an error detection unit 12 which detects an abnormal state (i.e., an error) of the scanner unit 10, an operation unit 14 through which various commands such as an image reading command are inputted, a display unit 16 on which various types of information such as an operation status of the image reading device 2 and messages are displayed, an external memory interface 18, a communication unit 20, and a control unit 30 which controls the internal components of the image reading device 2. These internal components are connected to each other via a bus 22.

The scanner unit 10 has an ADF (Automatic Document Feeder) which picks up documents one by one from a set of documents placed on a document base (not shown) and to carry the document to a line sensor for image reading. Therefore, through use of the ADF, it is possible to read continuously images from a plurality of documents.

The error detection unit 12 detects an abnormal state such as a paper jam caused when a document is being carried on a carrying path by the ADF. More specifically, the error detection unit 12 has a sensor which detects an abnormal state and outputs a detection signal.

The control unit 30 is implemented, for example, by a microcomputer chip in which a CPU, a ROM 31 and a RAM 32 are embedded (see FIG. 1). In accordance with a program stored, for example, in the ROM 31, the control unit 30 controls the scanner unit 10 to read images from documents placed on the document base.

When an image reading command is inputted through the operation unit 14, the control unit 30 controls the scanner unit 10 to read sequentially images from the documents, and acquires read data (hereafter, referred to as scanned data) outputted by the scanner unit 10.

When the reading operation of all the documents by the scanner unit 10 has finished. The control unit 30 converts the scanned data including images corresponding to the total number of documents, into a file having a predetermined file format (e.g., PDF (Portable Document Format), or TIFF (Tagged Image File Format)).

To the external memory interface 18, various types of external memories such as a flash memory can be attached. The communication unit 20 interfaces the image reading device 2 with a network to communicate with external devices (e.g., information processing terminals (i.e., personal computers) and a file server) on the network.

A user is able to operate the image reading device 2 through the operation unit 14 or an information processing terminal. More specifically, the user is allowed to make settings on the image reading device 2 to define one of an external memory, an information processing device and a file server on the network as a destination device to which a file created by the control unit 30 is to be transmitted. The control unit 30 transmits a file to the destination device set as described above.

Figure 2:
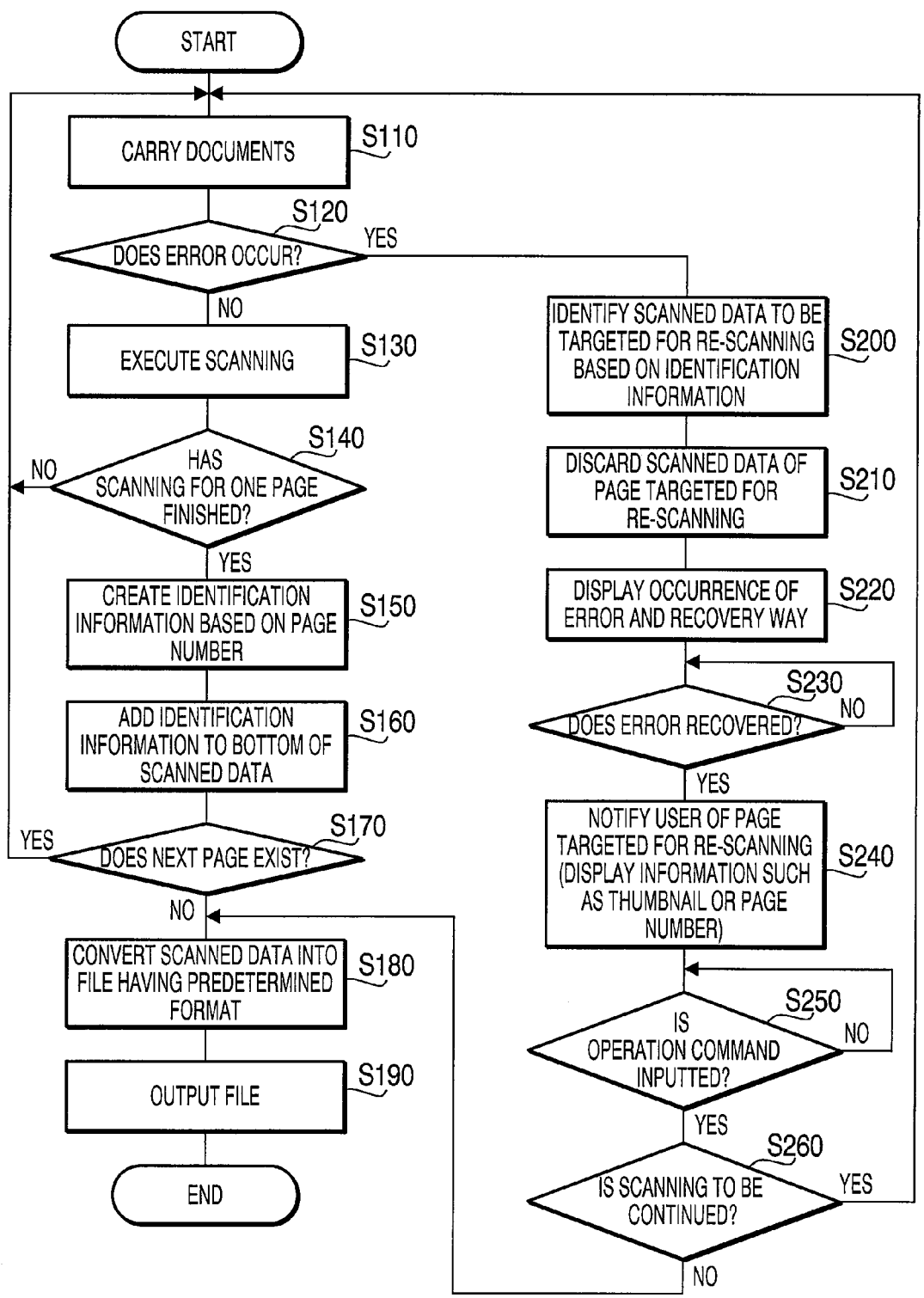
FIG. 2 is a flowchart illustrating a control process executed under control of a control unit of the image reading device.

Through a control process shown in FIG. 2, the control unit 30 acquires scanned data of images corresponding to the tonal number of documents by controlling the scanner unit 10, and converts the scanned data into a single file. The control process is executed when an image reading command is inputted to the image reading device 2 through the operation unit 14 or when an image reading command is inputted from the information processing device on the network to the image reading device 2.

As shown in FIG. 2, when the control process is started, the control unit 30 drives the ADF of the scanner unit 10 to carry a document (step S110). Then, the control unit 30 judges whether an abnormal state (an error) such as a paper jam is detected by the error detection unit 12. When an error is not detected (S120: NO), the control unit 30 controls the scanner unit 10 to execute image reading (i.e. scanning) with the line sensor (step S130). The scanned data obtained in step 5130 is stored in a certain area for storing the scanned data in the RAM 32.

When the scanning process of steps 5110 to 5130 is finished, the control unit 30 judges whether the image scanning for one page is finished (step S140). When the image scanning for one page is not finished (S140: NO), control returns to step S110 to continue the image scanning.

When the image scanning for one page is finished (S140: YES), the control unit 30 creates identification information of the scanned data based on the page number of the document for which the last image scanning is finished (step S150). Then, the control unit 30 adds the identification information to the bottom of the scanned data stored in the RAM 32 (step S160). The page number means the number of documents of which images have been successfully obtained through the steps S110 to S140 since the start of the control process. The page number is incremented by one ("1", "2", "3" . . . ) each time the image scanning for one page is finished in step S140.

Then, the control unit 30 judges whether a next document to be scanned exists on the document base of the scanner unit 10 (step S170). When the next document exists on the document base (S170: YES), control returns to step S110. When no document exists on the document base (S170 NO), control proceeds to step S180 where the scanned data corresponding to the total pages of the documents stored in the RAM 32 is converted into a single file having the predetermined format.

After thus converting the scanned data into the single file, control proceeds to step S190 where the converted file is output to the destination device (e.g., one of the external memory, the information processing device and the file server on the network) which has been set in advance. It should be noted that the control unit 30 which has outputted the file deletes the scanned data in the RAM 32.

When the control unit 30 judges in step 5120 that an error such as a paper jam is detected by the error detection unit 12, control proceeds to step 5200. Since in this case it is impossible to continue to execute the image scanning, the control unit 30 identifies, from the scanned data stored in the RAM 32, scanned data of a page for which the image scanning for one page has not finished based on the identification information added to the bottom of the scanned data of a page for which the image scanning has successfully finished.

That is, in step 5200, the control unit 30 identifies, as a target for re-scanning, scanned data to which the identification information is not added based on the scanned data stored in the RAM 32.

If an error is detected in step S120 while the image scanning is executed for the first page, no scanned data to which the identification information is added exists in the RAM 32. In such a case, the control unit 30 identifies, as the target for re-scanning, the scanned data of the first page of the document.

Next, the control unit 30 deletes the scanned data of the page of the target for re-scanning from the RAM 32 (step S210). Then, the control unit 30 displays a predetermined message on the display unit 16 to notify the user of occurrence of an error and a way for recovering the error (step S220).

In this embodiment, each time the image scanning for one page of the document is finished, the identification information is added to the bottom of the scanned data. Therefore, in step S210, from the entire scanned data stored in the RAM 32, data ranging between the end of entire scanned data and the identification information added to the scanned data at the last is deleted.

For example, in step S220, a message "An error occurs in image scanning. A paper jam occurs. Please remove the jammed paper." or an image indicating the type of the error may be displayed on the display unit 16.

When the image reading command has been inputted from the information processing device on the network, the control unit 30 transmits a notification indicating occurrence of the error to the information processing device via the communication unit 20 in addition to displaying the message on the display unit 16.

After thus displaying the error message on the display unit 16, the control unit 30 waits until the scanner unit 10 is restored to a normal state by monitoring the detection signal from the error detection unit 12 or a restoration command inputted through the operation unit 14 to judge whether the error of the scanner unit 10 is resolved (step S230).

More specifically, the control unit 30 judges that the scanner unit 30 is restored to the normal state when the image scanner 10 moves to the state where the error detection unit 12 does not detect the abnormal state and the detection signal from the error detection unit 12 is inactivated, or when the restoration command is inputted by the user through the operation unit 14.

When the scanner unit 10 is restored to the normal state (S230: YES), the control unit 30 identifies, from the entire scanned data stored in the RAM 32, scanned data for which the image scanning for one page is successfully finished at the last (i.e., scanned data of the last page to which the identification information has been added at the last). Further, the control unit 30 creates a thumbnail (i.e., a reduced image) of the last page based on the identified scanned data and displays the thumbnail on the display unit 16 to notify the user of the document to be targeted for re-scanning (step S240).

In step S240, the control unit 30 may obtain the page number of the document to be targeted for re-scanning based on the total number of pages of the scanned data stored in the RAM 32, and may display the page number on the display unit 16.

After thus notifying the user of the page targeted for re-scanning in step S240, the control unit 30 waits until an operation command (e.g., a command for stating re-scanning or a command for ending the scanning) is inputted through the operation unit 14 (step S250).

When the operation command is inputted, the control unit 30 judges whether the operation command is the command for starting the re-scanning or the command for ending the scanning (step S260). When the operation command is the command for staring the re-scanning (S260: YES), control returns to step S110 to start the scanning from the page targeted for the re-scanning. When the operation command is the command for ending the scanning (S260: NO), control proceeds to step S180 where the entire scanned image data stored in the RAM 32 is converted into a single file.

It should be noted that scanned data obtained in step S130 after reception of the command for starting the re-scanning is stored in the RAM 32 to be added to the end of the scanned data of the last page.

As described above, when an error occurs in the scanner unit 12 during the image scanning by the scanner unit 12, the control unit 30 temporarily stops obtaining the scanned data from the scanner unit 10, and restarts obtaining the scanned data from the scanner unit 10 when the scanner unit 10 is restored to the normal state and the command for starting re-scanning is inputted by the user.

The control unit 30 stores scanned data obtained after re-start of the scanning so that the scanned data obtained after re-start of the scanning is merged to the scanned data already stored in the RAM 32 before occurrence of the error. Furthermore, when the image scanning is finished for all the documents placed on the document base of the ADF, the control unit 30 converts the entire scanned data stored in the RAM 32 into a signal file having the predetermined format.

Therefore, according to the embodiment, even if the image scanning for a plurality of documents is interrupted by an error in the scanner unit 10, it is not necessary to begin again the image scanning from the first page of the documents. Such a configuration makes it possible to decrease the time for executing the image scanning for a plurality of documents.

When the control unit 30 stores the scanned data obtained from the scanner unit 10 in the RAM 32, the control unit 30 adds the identification information to the bottom of the scanned data for one page of the document. When the image scanning is interrupted due to an error of the scanner unit 10, the control unit 30 discards the scanned data for which the image scanning for one page has not been successfully finished, based on the identification information.

Such a configuration prevents unnecessary scanned data from remaining in the RAM 32 when an error occurs in the scanner unit 10, and thereby prevents newly obtained scanned data from being merged to the unnecessary scanned data. Consequently, the file finally created after completion of the image scanning for all the documents contains only scanned data of the necessary images obtained from all the documents. That is, according to the embodiment, it becomes possible to prevent unnecessary images from being included in the file.

According to the embodiment, when the scanner unit 10 is restored to the normal state and the image scanning is restarted after occurrence of an error in the image scanner 10 during the image scanning, a thumbnail of the document scanned at the last is displayed on the display unit 16. Such a configuration enables the user to easily identify the next document for which the image scanning should be continued. Consequently, usability of the image reading device 2 can be enhanced.

According to the embodiment, when the scanner unit 10 is restored to the normal state after the scanner unit 10 stops obtaining the scanned data due to an error occurred in the scanner unit 10, the user is able to convert the entire scanned data stored in the RAM 32 into a single file.

Therefore, if the user is satisfied with the scanned data of the documents which have been scanned before occurrence of an error in the scanner unit 10, the user is allowed to convert the scanned data into a single file without continuing the image scanning. That is, it becomes possible to decrease the time for scanning the documents.

Although the present invention has been described in considerable detail with reference to certain preferred embodiments thereof, other embodiments are possible.

In the above described embodiment, the control unit 30 operates to store the scanned data obtained from the scanner unit 10 in the RAM 32 embedded therein. However, the image reading device 2 may be provided with a storage unit (e.g., a hard disk drive) which stores scanned data. In this case, even if the number of documents to be scanned continuously is large, the scanned data of the documents can be reliably stored in the storage unit of the image reading device 2. Alternately, the scanned data may be stored in an external memory attached to the external memory interface 18.

The scanned data may be stored in a file server on the network, for example, by transmitting sequentially the scanned data to the file server in a streaming mode. In this case, by adding the identification information to the scanned data on a basis of a unit of one page, it becomes possible to convert the entire scanned data into a single file as in the case of the above described embodiment.

In the above described embodiment, the identification information is added to the bottom of the scanned data each time the image scanning for one page of the document is finished. However, the identification information may not be necessarily added to the bottom of the scanned data as long as the scanned data can be identified with the identification information for each page.

In the above described embodiment, the various features are implemented on a dedicated device (i.e., the image reading device 2) designed specifically for image scanning. However, the features may be implemented on various types of devices having a scanner unit with an ADF. For example, the features may be implemented on a multifunction peripheral which has multiple functions as a scanner, a printer and a copying device.

What is claimed is:

1. An image reading device, comprising:
a reading unit configured to read images from a set of documents by carrying the documents one by one;
a storing unit configured to store read data which the reading unit has obtained by reading the documents;
an error detection unit configured to detect an error of an operation in the reading unit,
wherein the image reading device is configured to stop reading of the documents by the reading unit when the error is detected by the error detection unit,
and to instruct the reading unit to restart reading of the documents; and
a data processing unit configured to:
add identification information, identifying read data corresponding to one page of the documents, to the read data stored in the storing unit each time read data corresponding to one page of the documents is obtained by the reading unit;
identify read data corresponding to a page last obtained by the reading unit before detection of the error in accordance with the corresponding added identification information when the reading of the documents is restarted after the error is detected;
store the read data obtained after restart of reading of the document in the storing unit such that the read data obtained after restart of reading continues from the identified read data corresponding to the page last obtained by the reading unit before detection of the error; and
convert an entirety of the read data of the documents stored in the storing unit into a single file having a predetermined format.

2. The image reading device according to claim 1,
wherein the data processing unit is configured to:
add the identification information to a bottom of the read data corresponding to one page; and
delete the read data, which has been stored in the storing unit to allow continued reading from the identification information corresponding to the page last obtained by the reading unit before detection of the error, from the entirety of the read data stored in the storing unit, when the reading of the documents is stopped after the error is detected.

3. The image reading device according to claim 1,
further comprising a display unit,
wherein the data processing unit is further configured to:
identify read data corresponding to a last page obtained successfully by the reading unit, from the entire read data in the storing unit, based on the identification information corresponding to the page last obtained by the reading unit before detection of the error, when the reading of the documents is stopped after the error is detected; and
display an image corresponding to the identified read data on the display unit.

4. The image reading device according to claim 1,
wherein the image reading device is configured to instruct the reading unit to restart reading of the documents when recovery from the error is detected by monitoring a state of the error detection unit.

5. The image reading device according to claim 1,
wherein the image reading device is configured to instruct the reading unit to restart reading of the documents in accordance with a user command.

6. A non-transitory computer readable medium having computer readable instructions stored thereon, which, when executed by a processor of an image reading device, cause the image reading device to:
control a reading unit of the image reading device to read images from a set of documents by carrying the documents one by one;
store read data obtained by reading the documents in a storing unit including adding identification information, identifying read data corresponding to one page of the documents, to the read data stored in the storing unit each time read data corresponding to one page of the documents is obtained by the reading unit;
detect an error of an operation in the reading unit;
stop reading of the documents by the reading unit when the error is detected;
instruct the reading unit to restart reading of the documents in response to recovery from the error including identifying read data corresponding to a page last obtained by the reading unit before detection of the error in accordance with the corresponding added identification information when the reading of the documents is restarted after the error is detected;
process the read data by storing the read data obtained after restart of reading of the document in the storing unit such that the read data obtained after restart of reading continues from the identified read data corresponding to the page last obtained by the reading unit before detection of the error; and
convert an entirety of the read data of the documents stored in the storing unit into a single file having a predetermined format.

7. The computer readable medium according to claim 6,
wherein the identification information is added to a bottom of the read data corresponding to one page; and
wherein the instructions, when executed, further cause the image reading device to delete the read data, which has been stored in the storing unit to allow continued reading from the identification information corresponding to the page last obtained by the reading unit before detection of the error, from the entirety of the read data stored in the storing unit when the reading of the documents is stopped after the error is detected.

8. The computer readable medium according to claim 6,
wherein the instructions, when executed, further cause the image reading device to:
identify read data corresponding to a last page obtained successfully by the reading unit, from the entirety of the read data in the storing unit, based on the identification information corresponding to the page last obtained by the reading unit before detection of the error, when the reading of the documents is stopped after the error is detected; and
display an image corresponding to the identified read data on a display unit of the image reading device.

9. The computer readable medium according to claim 6,
wherein instructing the restart of reading of the documents when recovery from the error is detected is performed by monitoring a state of an error detection unit of the image reading device.

10. The computer readable medium according to claim 6,
wherein instructing the restart of reading of the documents is performed in accordance with a user command.

11. A method for reading a set of documents to be implemented on an image reading device, comprising the steps of:
  controlling a reading unit of the image reading device to read images from the set of documents by carrying the documents one by one;
  storing read data obtained by reading the documents in a storing unit including adding identification information, identifying read data corresponding to one page of the documents, to the read data stored in the storing unit each time read data corresponding to one page of the documents is obtained by the reading unit;
  detecting an error of an operation in the reading unit;
  stopping reading of the documents by the reading unit when the error is detected;
  instructing the reading unit to restart reading of the documents in response to recovery from the error including identifying read data corresponding to a page last obtained by the reading unit before detection of the error in accordance with the corresponding added identification information when the reading of the documents is restarted after the error is detected;
  processing the read data by storing the read data obtained after restart of reading of the document in the storing unit such that the read data obtained after restart of reading continues from the identified read data corresponding to the page last obtained by the reading unit before detection of the error; and
  converting an entirety of the read data of the documents stored in the storing unit into a single file having a predetermined format.

12. The method according to claim 11,
  wherein the identification information is added to a bottom of the read data corresponding to one page; and
  wherein the method further comprises deleting the read data, which has been stored in the storing unit to allow continued reading from the identification information corresponding to the page last obtained by the reading unit before detection of the error, from the entirety of the read data stored in the storing unit, when the reading of the documents is stopped after the error is detected.

13. The method according to claim 11, further comprising:
  identifying the read data corresponding to a last page obtained successfully by the reading unit, from the entirety of the read data in the storing unit, based on the identification information corresponding to the page last obtained by the reading unit before detection of the error, when the reading of the documents is stopped after the error is detected; and
  displaying an image corresponding to the identified read data on a display unit of the image reading device.

14. The method according to claim 11,
  wherein the restart of reading of the documents is instructed when recovery from the error is detected by monitoring a state of an error detection unit of the image reading device.

15. The method according to claim 11,
  wherein the restart of reading of the documents is instructed in accordance with a user command.

* * * * *